Jan. 23, 1940.  M. E. LANGE  2,187,831
OVERDRIVE INDICATOR
Filed July 6, 1936  4 Sheets-Sheet 1

INVENTOR.
MAX E. LANGE
BY
Kwis, Hudson & Kent
ATTORNEYS

Jan. 23, 1940.  M. E. LANGE  2,187,831
OVERDRIVE INDICATOR
Filed July 6, 1936  4 Sheets-Sheet 2

INVENTOR.
MAX E. LANGE
BY
Kuris Hudson & Kent
ATTORNEYS

Jan. 23, 1940.                    M. E. LANGE                    2,187,831
                              OVERDRIVE INDICATOR
                             Filed July 6, 1936          4 Sheets-Sheet 3

INVENTOR.
MAX E. LANGE
BY Kwis, Hudson & Kent
ATTORNEYS.

Jan. 23, 1940.　　　M. E. LANGE　　　2,187,831
OVERDRIVE INDICATOR
Filed July 6, 1936　　　4 Sheets-Sheet 4

INVENTOR.
BY MAX E. LANGE
Kwis, Hudson & Kent
ATTORNEYS.

Patented Jan. 23, 1940

2,187,831

UNITED STATES PATENT OFFICE 2,187,831

OVERDRIVE INDICATOR

Max E. Lange, Cleveland Heights, Ohio

Application July 6, 1936, Serial No. 89,058

7 Claims. (Cl. 177—311)

This invention relates to signaling apparatus for use with motor vehicles or the like having overdrive mechanism to automatically indicate whether the overdrive mechanism is operating.

Certain of the motor vehicles now in use are provided with an overdrive unit in the transmission mechanism between the engine and driving axle and which affords an engine-to-driving axle transmission ratio of approximately 3 to 1 in addition to the approximately 4 to 1 ratio heretofore available in conventional high gear. The control means provided for rendering the overdrive unit operative or inoperative is in part manual and in part automatic. The overdrive unit also includes an overrunning clutch so arranged that it permits free-wheeling operation of the vehicle while in high gear but does not permit free-wheeling while the vehicle is in overdrive. In the operation of motor vehicles provided with such overdrive units it is not always possible for the operator to know whether the overdrive unit has been rendered operative, and hence to know whether the vehicle is operating in high gear with free-wheeling or in overdrive. This lack of definite and timely information on the part of the operator as to the operating condition of the vehicle is unsatisfactory and may, in some instances, give rise to dangerous or hazardous situations.

By the present invention, as will be explained more fully hereinafter, I aim to provide novel signaling apparatus which will operate automatically to indicate to the driver of the vehicle whether or not the overdrive unit has been put into operation.

Another object of my invention is to provide an overdrive indicator having a plurality of switches, at least one of which is responsive to the operation of a manual control, and another of which is automatically operable in response to a condition of operation of the vehicle.

A further object of my invention is to provide a novel indicator for use with a motor vehicle having an accelerator and an overdrive unit provided with a manual control for initially rendering such unit operative, such indicator comprising a signal means and switches associated, respectively, with the accelerator and the overdrive control.

Still another object of my invention is to provide an overdrive indicator having signal means and switches including a switch operable in response to a manual control member and an automatically operable speed responsive switch.

A further object of my invention is to provide novel indicating apparatus for a motor vehicle having an overdrive unit and a generator driven from the engine of the vehicle, and wherein the indicating apparatus includes a signal means and a plurality of control switches, one of which is a relay having a magnet winding in circuit with the generator and the other of which is responsive to operation of a manual control member.

The invention may be further briefly summarized as consisting in certain novel combinations and arrangements of parts hereinafter described and more particularly set out in the appended claims.

In the accompanying sheets of drawings,

Fig. 1b is a transverse sectional view taken through the overdrive unit as indicated by section line 1b—1b of Fig. 1a.

Fig. 1c is another transverse sectional view taken on line 1c—1c of Fig. 1a.

More detailed reference will now be made to the accompanying drawings for the purpose of disclosing my overdrive indicator, but in this connection it should be understood that the drawings are to be regarded as illustrative only, because the invention may be embodied in various other arrangements than those herein illustrated.

Figures 1, 2, 3, 17:
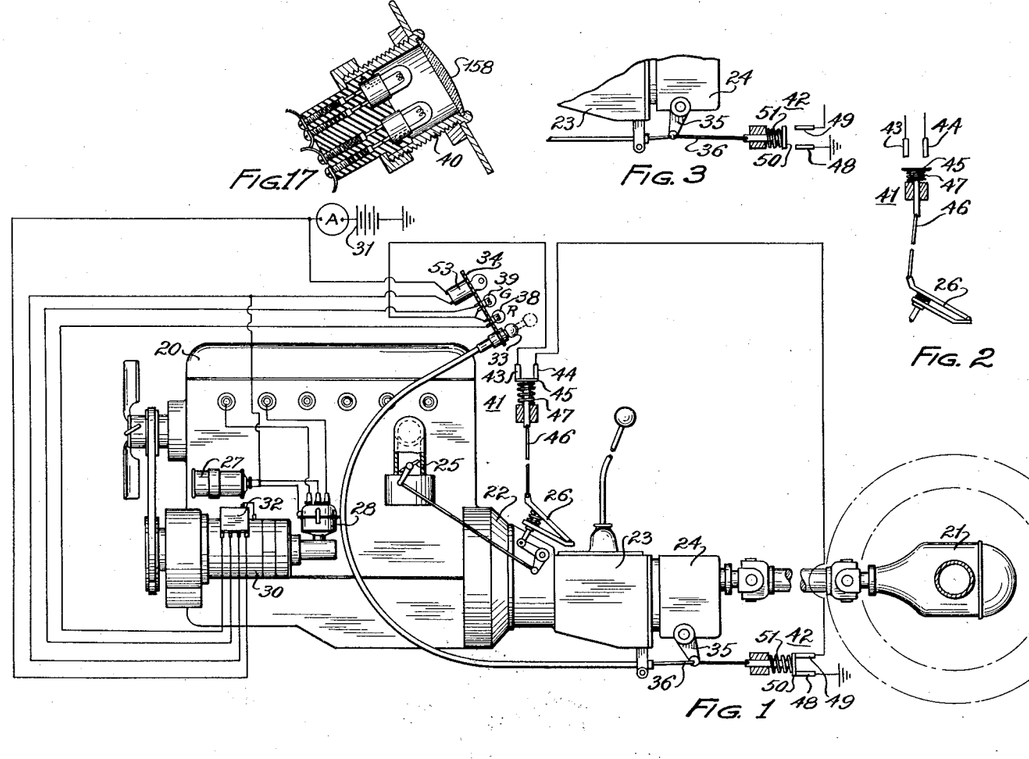
Fig. 1 is a side elevation, in more or less diagrammatic form, showing a vehicle engine and transmission to which my overdrive indicator has been applied.
Fig. 2 is a fragmentary view of a portion of the apparatus of Fig. 1, showing the accelerator switch opened.
Fig. 3 is a similar fragmentary view showing the open position of a switch associated with the manual control for the overdrive unit.
Fig. 17 is a sectional view illustrating another form of my signal lamp arrangement.

In Fig. 1 of the drawings I have represented a motor vehicle power plant embodying an overdrive unit and having my overdrive indicator applied thereto. The power plant as here illustrated includes an internal combustion engine 20 which is connected with a driving axle 21 through clutch and transmission devices 22 and 23. The transmission device includes an overdrive unit 24 which, as mentioned above, provides a lower engine-to-driving axle transmission ratio than corresponding ratio for the conventional high gear. The speed of the engine 20 is controlled by a throttle 25 which is actuated by means of a manual control, for example, an accelerator pedal 26. The equipment here illustrated also includes a spark coil 27 and a combined timer and distributor unit 28. A generator 30 of the usual type is arranged to be driven by the engine 20 and is electrically connected with a storage battery 31, through a generator cut-out 32.

The overdrive unit 24 forms no part of my invention except in combination with my indicator and the other apparatus of the vehicle. However, for a better understanding of the present invention it should be explained that the overdrive unit includes gearing which when operatively included in the transmission system provides a lower engine-to-driving axle ratio than would be obtained from the conventional high gear of the transmission unit 23, or, in other words, when in use permits a lower engine speed for a given vehicle speed. In addition to the gearing just mentioned, the overdrive unit 24 includes an overrunning clutch which permits the engine 20 to slow down to idling speed without a corresponding reduction in vehicle speed, or, in other words, permits free-wheeling of the vehicle. The overdrive unit also includes speed responsive means by which the gearing can be automatically rendered effective or ineffective after the unit has been rendered initially operative by manipulation of a manual control. This manual control is illustrated in Fig. 1, it being, in this instance, in the form of a knob or handle 33 mounted on the dash 34 and connected to a lever 35 of the overdrive unit by a flexible member 36.

Figure 1A:
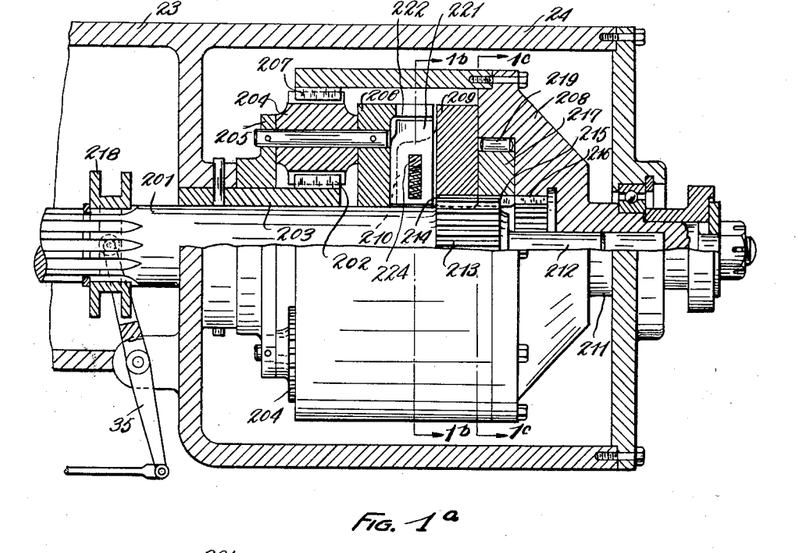
Fig. 1a is a longitudinal sectional view taken through an overdrive unit identical with or similar to the overdrive unit shown in Fig. 1.
Figure 1B:
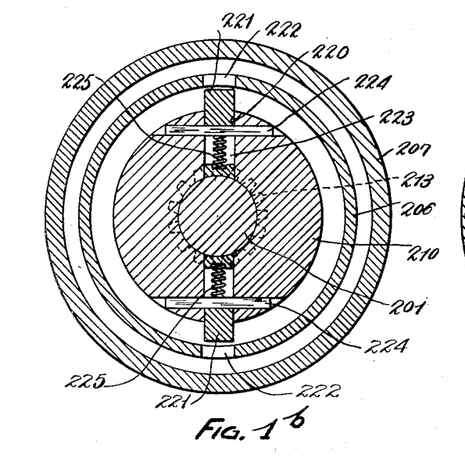
Figure 1C:
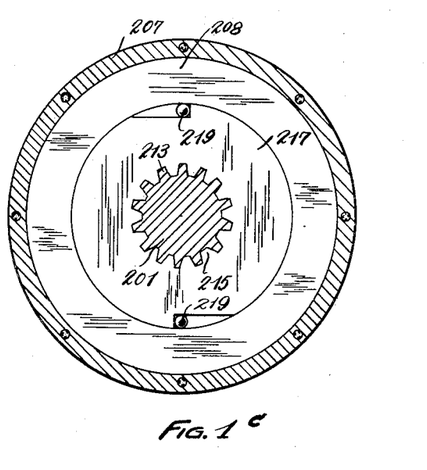

For further explanation and a better understanding of the overdrive arrangement just mentioned, reference may be had to Figs. 1a, 1b and 1c in which I show an overdrive unit similar to or identical with the unit 24 of Fig. 1. This overdrive unit is contained in a section of the housing of the transmission unit 23 and surrounds an axially shiftable main shaft 201. The above mentioned gearing which forms a part of this overdrive unit consists of a sun gear 202 held stationary by the sleeve 203 being pinned to the housing, planet pinions 204 carried in a planet cage formed by cage member 205 and clutch shell 206, and a ring gear member 207 carried by the hub member 208. Between the planet cage and the hub member 208 is a clutch core member 209 having a reduced extension 210 which projects into the recess of the clutch shell 206.

The hub member 208 has a shaft portion 211 which is journaled in a wall of the housing and projects therethrough for connection with the propeller shaft of the vehicle. The main shaft 201 is slidable and rotatable in the sleeve 203 and has a reduced portion 212 which is slidable and rotatable in the hub member 208. A relatively wide pinion 213 on the main shaft 201 cooperates with ring gears 214, 215 and 216 which are carried respectively by the clutch core member 209, a free-wheeling cam 217 and the hub member 208. When the pinion 213 is in the position shown in Fig. 1a it connects the core member 209 with the free-wheeling cam 217 and, when the main shaft 201 is shifted rearwardly by means of the lever 35 and the collar 218, the pinion engages the ring gear 216 and establishes a direct drive connection between the main shaft and the propeller shaft. The free-wheeling cam 217 cooperates with the hub member 208 and the rollers 219 to provide an overrunning clutch between the propeller shaft and the main shaft. In the arrangement just described the clutch core member 209 and the clutch shell 206 rotate about the main shaft and the cage member 205 rotates about the sleeve 203.

The reduced portion 210 of the clutch core member 209 has radial slots 220 with pawls 221 therein which are adapted to be projected into slots 222 of the clutch shell by centrifugal force when the clutch core and clutch shell rotate in synchronism at a given rate of speed. The pawls have openings 223 through which the square pins 224 extend and in which the pawl-retracting compression springs 225 are disposed.

In the operation of a vehicle equipped with the overdrive unit just described, the operator decides whether he wishes to drive the vehicle with or without the overdrive effect and sets the knob or handle 33 accordingly. If he wishes to operate without the overdrive effect or, in other words, with only the conventional transmission, the knob 33 is withdrawn to its dotted position which shifts the pinion 213 rearwardly into engagement with the ring gear 216 and renders the overdrive unit, including the overrunning clutch, wholly inoperative. If he wishes to make use of the overdrive, the knob 33 is pushed in to its full line position illustrated in Fig. 1 to thereby shift the pinion 213 to the setting shown in Fig. 1a, and when this has been done the overdrive gearing is rendered available for use and the overrunning clutch is rendered effective and places the vehicle in freewheeling.

Assuming now that the knob 33 has been pushed in to the overdrive setting and that the vehicle has been brought to a given speed and is operating in conventional high gear, the operator can now render the overdrive gearing effective by releasing the accelerator pedal 26 for an interval of approximately two seconds during which the overrunning clutch of the overdrive unit permits the engine 20 to slow down sufficiently to bring the clutch core member 209 into synchronism with the clutch shell 206. If the speed at which the clutch core and shell are rotating in synchronism is high enough, that is to say if the vehicle speed is above the given value, the pawls 221 of the clutch core will be thrown out by centrifugal force and will engage in the slots 222 of the clutch shell. When this engagement has taken place the overdrive gearing is effective and the drive will then be through main shaft 201, pinion 213, clutch core member 209, pawls 221, clutch shell 206, planet pinions 204, ring gear 207 and hub member 208. When the overdrive gearing has thus been rendered effective the driving axle is permanently connected with the engine 20 through the drive connections just traced.

If the conditions above mentioned are satisfied at the time the operator wishes to shift into overdrive, that is, if the vehicle speed is above the given value and if the accelerator is released for the required interval, the shift will be completed and the overdrive gearing will be rendered effective. However, if these conditions are not satisfied the pawls 221 will not engage in the slots 222 of the clutch shell and, hence, the overdrive gearing will not be rendered effective and the vehicle will remain in conventional high gear with free-wheeling.

When the vehicle is operating in overdrive gear and the operator wishes to shift back to conventional high gear he can do so by releasing the accelerator for a short interval, provided certain operating conditions are satisfied. The shift back into conventional high gear can be made only if the vehicle is traveling at a slower rate than the above mentioned given speed at which the overdrive engagement becomes possible. At vehicle speeds higher than the given speed, the pawls 221 will not recede even though the accelerator is released because the centrifugal force acting on the pawls is greater than the retracting force exerted by the springs 225. For vehicle speeds lower than the given speed, the retracting force of the springs will be greater than the centrifugal force on the pawls but the pawls may still remain in their outer position if the driving friction between the pawls and the clutch shell 206 is too great to be overcome by the springs. However, the release of the accelerator for a short interval while the vehicle is in overdrive gear and traveling at a rate slower than the given speed will result in the pawls 221 being retracted from the slots of the clutch shell and thereafter the vehicle will be in conventional high gear with free-wheeling.

My overdrive indicator serves to indicate to the driver at the time of an attempted shift into or out of overdrive gear whether or not the desired shift has actually been accomplished, and may also be used at other times to indicate whether the vehicle is traveling in conventional high gear or in overdrive gear.

In general, my overdrive indicator comprises a signaling device, and a control means therefor embodying a plurality of switches at least one of which is responsive to the operation of a manual control member. The signal device may be any suitable form of device capable of rendering a signal, for example, it may comprise one or more incandescent lamps. In this instance the signal device comprises red and green incandescent lamps 38 and 39, which may be mounted on the dash 34, or, as shown in Fig. 17, may be mounted in a housing 40 which is, in turn, mounted on the dash or some other available part of the vehicle.

The control arrangement for the signal device may include switches 41 and 42, which are responsive to the operation of manual control members with which they are associated. The switch 41 is associated with the accelerator 26 and may comprise stationary contacts 43 and 44, and a movable contact 45 which is connected with the accelerator as by means of a rod 46. The movable contact 45 is normally urged, as by a spring 47, in a direction to close the contacts 43 and 44 when the accelerator is released, and is moved to open position when the accelerator is depressed to cause opening of the throttle 25. The switch 42 is associated with the overdrive unit 24 and may be a similar switch having stationary contacts 48 and 49 and a movable contact 50. The latter contact is urged toward closed position by a spring 51 and is connected with the lever 35, so that it will be opened when the knob 33 is moved to its dotted line position.

When the signal means is in the form of the colored lamps 38 and 39, it is desirable to have the green lamp light and burn for at least a short interval if the operator's attempt to put the overdrive gearing into use has been successful and to have the red lamp light and burn for at least a short interval if the operator's attempt was unsuccessful. Various circuit arrangements may be provided for this purpose which include one or both of the switches 41, 42. For the purpose of automatically determining whether the red or green lamp should be lighted, I provide switch means which is responsive to a condition of operation of the vehicle. This switch means may be embodied in the generator cut-out 32, as will presently be explained by reference to Fig. 4, or may be embodied in a device separate from the cut-out as will be explained by reference to Fig. 9.

It can be conveniently explained at this point that the switch 41 is necessary to prevent the overdrive indicator from giving an incorrect signal as might otherwise occur when the operator depresses the accelerator and speeds up the engine immediately following an attempt to shift into overdrive gear. The purpose and functioning of this switch are explained more fully hereinafter.

Although the selecting switch for the signal lamps may be automatically operated in various ways, I find that it can be conveniently embodied in the generator cut-out or in a separate relay device, because such a cut-out or relay is dependent upon the operation of the generator, and this is in turn driven by and directly responsive to the speed of the engine 20. At the time that the operator releases the accelerator 26 to cause the overdrive gearing to be put into operation, as explained above, the vehicle is in free-wheeling, and upon the release of the accelerator the vehicle speed remains substantially the same, but the engine speed immediately begins to decrease, this being permitted by the overrunning clutch embodied in the overdrive device. The decrease in engine speed is immediately reflected in the output of the generator 30, and this fluctuation is utilized to automatically operate the lamp selecting switch.

I find it desirable to have the overdrive indicator in operation as soon as the vehicle engine is started, and to also have the indicator rendered inoperative as soon as the engine is stopped. To this end I provide suitable circuit connections such that the ignition switch 53 also serves as a master switch for the overdrive indicator.

When the lamp selecting switch is embodied in the generator cut-out 32, the switch may be in the form of auxiliary contacts 55, 56 and 57 (see Figs. 4 to 6 inclusive) which are additional to the usual contacts 58 and 59 of this device.

The cut-out itself may be of a type well known in the art having series and voltage coils 60 and 61 in circuit with the generator 30, and an armature 37 which carries the contact 59 and is responsive to energization of the coils. The usual purpose of a generator cut-out is, as is well understood in the art, to automatically disconnect the battery from the generator whenever the speed of the engine decreases below a predetermined value, and to thereby prevent discharge of the battery through the windings of the generator. By means of the voltage coil 61 the cut-out is rendered automatically capable of reestablishing the generator-to-battery connection when the engine speed again increases above the predetermined value and, by reason of the series coil 60 functioning as a holding means, is rendered capable of maintaining such generator-to-battery circuit so long as the engine speed remains above such predetermined value. As is usual in devices of this kind, the cut-out 32 embodies a tension spring 62, which acts on the armature 37 to normally open the contacts 58 and 59.

Figures 4, 5, 6, 7, 8, 9, 18:
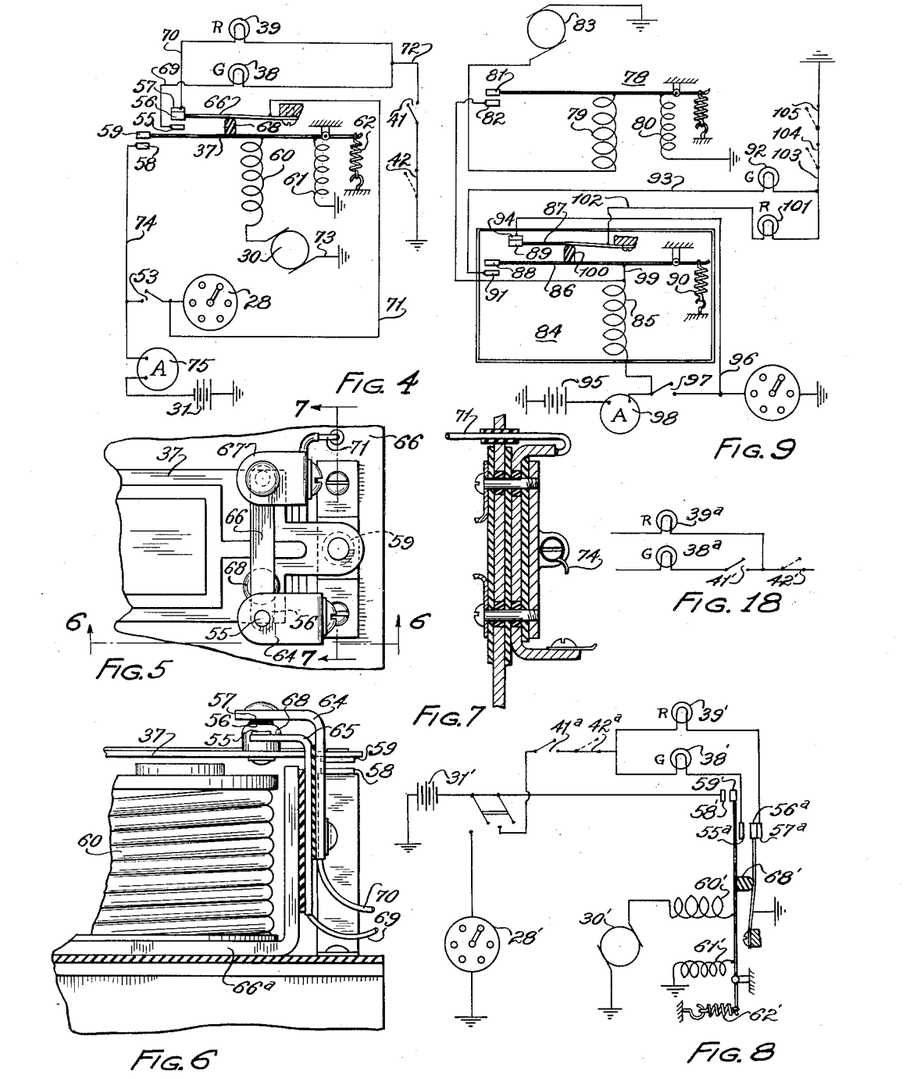
Fig. 4 is a wiring diagram illustrating one circuit arrangement for my overdrive indicator.
Fig. 5 is a partial plan view of a generator cut-out having auxiliary contacts forming a part of my overdrive indicator.
Fig. 6 is a sectional view thereof taken on line 6—6 of Fig. 5.
Fig. 7 is another sectional elevation taken through the cut-out as indicated by line 7—7 of Fig. 5.
Fig. 8 is a wiring diagram illustrating another circuit arrangement for my overdrive indicator.
Fig. 9 is a diagram illustrating still another circuit arrangement for my overdrive indicator.
Fig. 18 is a diagram illustrating an alternate arrangement for the connections of the signal lamps.

The auxiliary contacts 55, 56 and 57 constituting the lamp selecting switch, may be embodied in the cut-out in any suitable manner, such that the operation of this switch will be responsive to predetermined changes in the operating condition of the vehicle, in this instance predetermined changes in the speed of the engine 20. As shown in Figs. 5, 6 and 7 the stationary contacts 55 and 57 may be supported adjacent the main armature 37 by suitable brackets 64 and 65 mounted on, but insulated from, the frame 66a of the cut-out. The movable contact 56 may be carried by a shiftable or flexible finger 66 which may be supported from an insulated bracket 67 and which may be caused to engage the contact 57 by motion transmitted thereto from the main armature through an interposed insulating button 68. The finger 66 is movable in the opposite direction, either by spring pressure or by reason of its own resilience, to thereby engage the contact 56 with the contact 55 when the main armature 37 moves to close the contacts 58 and 59.

Suitable circuit connections are provided to enable the lamp selecting switch to accomplish its desired function. These circuit connections may include a conductor 69 connecting the stationary contact 55 with one terminal of the green lamp 38 and a conductor 70 connecting the stationary contact 57 with one terminal of the red lamp 39. The movable contact 56 may be connected with the ignition or master switch 53 through a current supply conductor 71. The opposite terminals of the red and green lamps 38 and 39 may be connected to ground by means of a connection 72 having the accelerator switch 41 and the overdrive unit switch 42 therein in series. In addition to the circuit connections just mentioned there are available, as a part of the usual wiring of the vehicle, a ground connection 73 at one side of the generator 30, and a connection 74 extending between the stationary contact 58 of the cut-out and the battery 31. This latter connection includes the usual ammeter 75 which is located between the battery and the ignition switch 53.

I consider the series arrangement of the switches 41 and 42 in the energizing circuit of the signal lamps to be an important part of my invention, because with this arrangement neither lamp can be lighted unless the operator performs the two acts necessary to render the overdrive unit operative, namely, the pushing in of the knob 33 and the releasing of the accelerator 26.

In the operation of my overdrive indicator, as thus far described, let it be assumed that the vehicle is traveling in conventional high gear at a speed higher than that required for the change to overdrive gearing and that the operator has pushed in the knob 33 and is about to release the accelerator 26. At this time the cut-out contacts 58 and 59 are closed and for this position of the cut-out armature the auxiliary contacts 55 and 56 are also closed. If the accelerator is now released in an attempt to shift into overdrive gear it causes closing of the switch 41 and results in the green light 38 being lighted. The circuit for the green light can be traced from ground and battery 31 through ammeter 75, switch 53, conductor 71, finger 66, contacts 56 and 55, and conductor 69 to the green light 38, and then back to ground through conductor 72 and switches 41 and 42. If the light signal remains green, that is, does not change to red during the interval that the accelerator is released, it indicates that the shift into overdrive gear has been completed.

The releasing of the accelerator for the shift into overdrive gear also causes the speed of the engine 20 to decrease to the value necessary to bring the rotation speeds of the clutch core 209 and the clutch shell 206 of the overdrive unit into synchronism to permit the pawls 221 to engage in the slots 222 and thereby automatically put the overdrive gearing into operation. The decrease in engine speed necessary for the engagement of the pawls 221 is permitted by the overrunning clutch of the overdrive unit. If the operator has released the accelerator for a period of time sufficient to permit the required decrease in the speed of the engine, the pawls 221 of the overdrive unit will engage in the slots 222 and the engine will thereafter be permanently connected with the driving axle. During the functioning just described the engine becomes connected with the driving axle and the engine speed does not decrease to the value necessary to cause opening of the cut-out contacts 58 and 59 and, therefore, the auxiliary contacts 55 and 56 for the green lamp remain closed and the light signal remains green indicating that the shift into overdrive gear has actually been made. The operator then depresses the accelerator 26 to restore the normal driving operation, that is, to proceed on his course in overdrive gear, whereupon the switch 41 will be opened and the green lamp 38 will go out.

If, however, in attempting to put the vehicle into overdrive the speed of the vehicle was too low or if for some other reason the overdrive gearing was not rendered effective, the engine will not be connected with the driving axle and the overrunning clutch will remain effective. In this situation the release of the accelerator by the operator for the attempted shift into overdrive gear will permit the engine speed to decrease below the predetermined value at which the cut-out contacts 58 and 59 open. The opening of these contacts will also cause opening of the contacts 55 and 56 and closing of the contacts 56 and 57. This results in the green light being extinguished and the red light being lighted which indicates to the operator that his attempt to put the vehicle into overdrive was unsuccessful and that the vehicle still remains in conventional high gear. The circuit for the red light can be traced as follows: from ground and battery 31 through ammeter 75, switch 53, conductor 71, finger 66, contacts 56 and 57, conductor 70 to red light 39, and then back to ground through conductor 72 and switches 41 and 42. Upon noting the red light, the operator depresses the accelerator to increase the vehicle speed for another attempt to render the overdrive effective and the depressing of the accelerator opens the switch 41 and extinguishes the red lamp.

At any time during the travel of the vehicle the operator can use my indicator to ascertain whether the vehicle is in overdrive gear or in conventional high gear. To do this it is only necessary to release the accelerator for a short interval which causes closing of the switch 41. If the overdrive gear is in use the engine is connected to the rear axle, as explained above, and a green light signal will be given. If the vehicle is in conventional high gear, the release of the accelerator will permit the engine to slow down to idling speed whereupon the light signal will change from green to red.

In Fig. 8 of the drawings I have diagrammatically represented an overdrive indicator which is identical with the arrangement of Fig. 4, with the exception that the switches 41 and 42 and the auxiliary contacts of the cut-out are reversed in location. In Fig. 8 switches 41a and 42a, corresponding with the switches 41 and 42 of Fig. 4, are located between the signal lamps and the ignition switch and the auxiliary contacts 55a, 56a and 57a of the cut-out are located between the lamps and the ground connection. In other respects the apparatus of Fig. 8 is substantially identical with that of Fig. 4 and various parts are designated by corresponding reference characters which have been primed.

In Fig. 9 I have shown an overdrive indicator which accomplishes the same results as the indicators of Figs. 4 and 8, but wherein the lamp selecting switch is not incorporated in the generator cut-out but is in the form of a separate relay or device which can be manufactured as an accessory unit and can be mounted at any available point on the vehicle. In this arrangement I show a cut-out 78 having series and voltage coils 79 and 80. The cut-out has the usual contacts 81 and 82 which, with the coil 79, are in series with the generator 83.

The lamp selecting switch or relay is a separate device 84 having a magnet coil 85 which is included in the generator circuit in series with the cut-out contacts 81 and 82. This switch is also provided with an armature member 86 and a finger 87, which carry contacts 88 and 89 and are adapted to be moved in one direction upon energization of the coil 85 and in the opposite direction by the tension spring 90. The contact 88 cooperates with a stationary contact 91 which is connected with the green lamp 92 by a conductor 93. The contact 89 cooperates with a stationary contact 94 which is connected to one side of the battery 95 through a conductor 96, an ignition switch 97 and an ammeter 98. The armature member 86 is also connected to the battery 95 through a conductor 99 and through the coil 85 and the ammeter 98. The armature member or finger 87, which is actuated from the armature member 86 through an insulating button 100, is connected with the red lamp 101 by a conductor 102. A common ground connection 103 provided for the lamps 92 and 101 includes an accelerator switch 104 and an overdrive unit switch 105. In the operation of the separate-relay type of indicator illustrated in Fig. 9, it will be seen that when the engine speed is above a predetermined value the cut-out contacts 81 and 82 are closed and, since this energizes the relay coil 85, the contacts 88 and 91 for the green light will be closed and the contacts 89 and 94 for the red light will be opened. The circuit for the green light can be traced as follows: from ground and battery 95 through the ammeter 98, the relay coil 85, conductor 99, armature 86, contacts 88 and 91, conductor 93 to green light 92, and then back to ground through conductor 103 and switches 104 and 105. The circuit for the red light may be traced as follows: from ground and battery 95, through ammeter 98, switch 97, conductor 96, contacts 94 and 89, armature 87, conductor 102 to red light 101, and then back to ground through conductor 103 and switches 104 and 105.

In the operation of the indicating apparatus already described, it will be seen that the signal lamp which is lighted, whether it be red or green, is extinguished when the operator again depresses the accelerator. It may, however, be desirable to have the red or green lamp burn continuously so that the apparatus will always show whether the vehicle is operating in conventional gear or in overdrive gear. In Figs. 10 to 16 inclusive I have illustrated an overdrive indicator which embodies the general features of the apparatus already disclosed, but which also provides for a continuous signal during the operation of the vehicle. As diagrammatically illustrated in Fig. 10, this form of my overdrive indicator may include a cut-out 110 associated with the generator 111, and a separate switch device 112 which embodies both the accelerator switch and the lamp selecting switch.

Figures 10, 11, 12, 14, 15, 16:
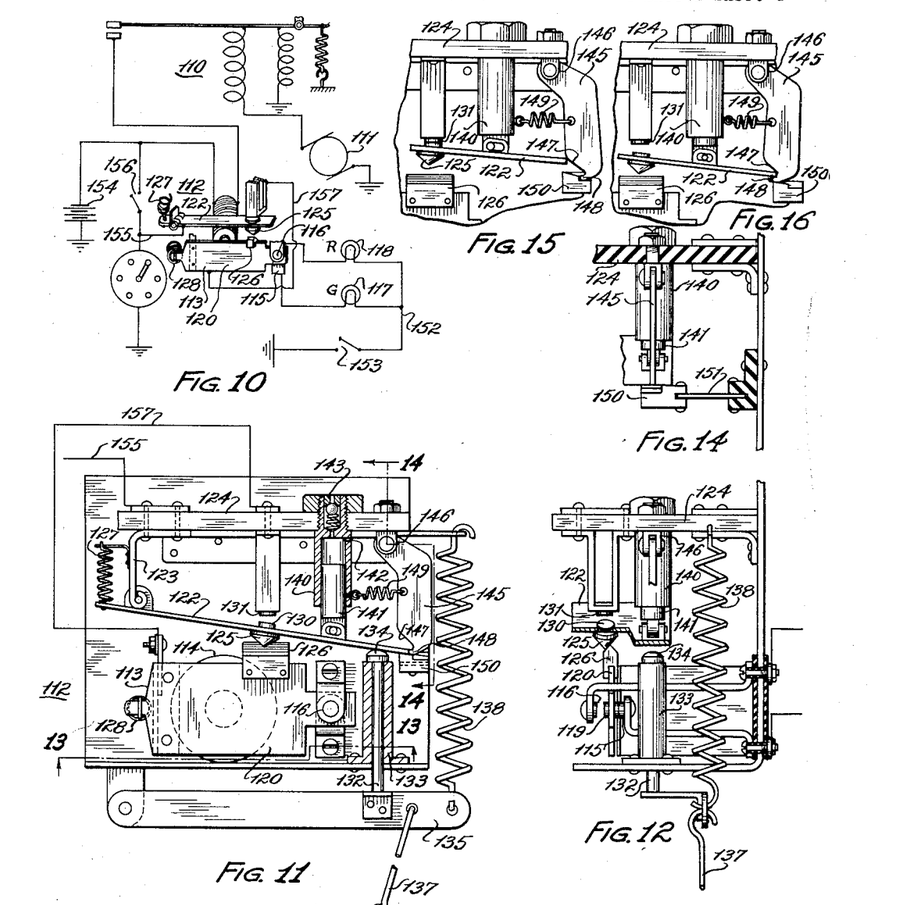
Fig. 10 is another diagram, but with parts shown in perspective, illustrating a modified form of my overdrive indicator and in which the signal means operates continuously.
Fig. 11 is an elevation, with parts in section, illustrating a switch device included in the arrangement of Fig. 10.
Fig. 12 is an end view of the apparatus of Fig. 11.
Fig. 14 is a sectional view taken on line 14—14 of Fig. 11.
Figs. 15 and 16 are elevational views similar to Fig. 11, but showing different positions for movable members of the device.
Figure 13:
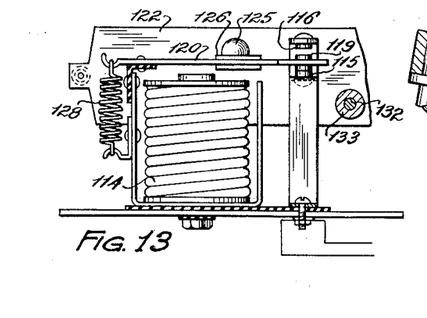
Fig. 13 is a sectional view taken on line 13—13 of Fig. 11.

As best shown in Figs. 11 and 12, the switch device 112 comprises a relay 113 having a magnet coil 114 in series with the contacts of the cut-out 110. This relay also has stationary contacts 115 and 116 connected, respectively, with the green and red signal lamps 117 and 118, and a movable contact 119 which is carried by an armature 120 and cooperates with the stationary contacts. The cooperating contacts 115, 116 and 119 constitute the lamp selecting switch which responds to a condition of operation of the vehicle, in this instance the speed of the engine.

The switch device 112 also includes a movable switch member 122 which constitutes a part of the accelerator switch and which also serves as a holding means for the armature 120 of the lamp selecting switch. The switch member 122 may be pivotally mounted on a bracket 123 extending from an insulating support 124 and may have a cone-like or wedge-like contact member 125 thereon for cooperation with a wedge-like contact member 126 carried by the armature of the relay. A tension spring 127 acts on the switch member 122 to normally urge the wedge member 125 toward engagement with the wedge member 126, so that the wedge members will retain the armature 120 in its upper or lower position to which it has been previously moved either by the tension spring 128 or the energization of the coil 114. The switch member 122 also carries a contact 130 for engagement with a stationary contact 131. The contacts 130 and 131 constitute the accelerator switch.

In addition to the tension spring 127 I provide actuating means for the switch member 122 which includes a plunger pin 132 slidably mounted in a bearing sleeve 133. A head 134 provided on the plunger pin engages the switch member 122 and the stem of the pin projecting rom the opposite end of the bearing sleeve engages a pivoted lever 135. This pivoted lever is connected with the accelerator 136 by a link 137 so that when the accelerator is depressed the lever and plunger pin will be moved in a direction to permit swinging of the switch member 122 to cause opening of the contacts 130 and 131 and engagement of the wedge member 125 with the wedge member 126. A tension spring 138 having one end thereof suitably anchored engages the lever 135 and normally tends to swing the same in a direction to cause closing of the contacts 130 and 131 and separation of the wedge-shaped contact members 125 and 126.

Reverting to the diagrammatic illustration of Fig. 10, it will be noted that the stationary contacts 115 and 116 of the relay 113 are connected, respectively, with the green and red lights 117 and 118 and that a common conductor 152 of the lamp circuit includes an overdrive unit switch 153 corresponding with the switch 42 of Fig. 1. The switch member 122 is connected with the battery 154 through a conductor 155 and an ignition switch 156 so that when the ignition switch is closed current can be supplied to armature 120 either directly through the members 125 and 126 or through contacts 130 and 131 and conductor 157.

As a part of the switch device 112 I provide a retarding means for the switch member 122, such that when the accelerator is released, the resulting movement of this switch member by the spring 138 in a direction to close the contacts 130 and 131 will be retarded for a period of time at least equal to the interval that the operator is required to release the accelerator to successfully cause the overdrive gearing to be put into operation. Any suitable retarding device may be employed for this purpose and, in this instance, I show a dash pot comprising a cylinder 140 supported from the insulating member 124 and a piston 141 slidable in the cylinder and connected with the switch member 122. The cylinder is provided with a restriction or orifice 142 of a size to retard the flow of air out of the cylinder, whereby the closing of the contacts 130 and 131 under the influence of the spring 138 is delayed. The cylinder may also be provided with a check valve 143 which is arranged to close during the retarded movement of the switch member 122, but opens to freely admit air to the cylinder upon movement of the switch member in the opposite direction.

In addition to the retarding device provided for the switch member 122, I also provide a locking member 145 in the form of a latch or trigger, which cooperates with the switch member to prevent engagement of the wedge member 125 with the wedge member 126, and, therefore, prevent burning of either signal lamp in the event that the operator has not released his accelerator for a sufficient interval of time to permit the contact 130 to move into engagement with the contact 131. The latch 145 may be pivoted on a bracket 146 supported from the insulating member 124, and at its free end may have an inclined cam portion 147 and a hook-like locking portion 148 adjacent thereto. The outer end of the latch member is normally urged in a direction to engage the outer end of the switch member 122 by means of a tension spring 149, so that when the accelerator is released and the switch member is retracted by the spring 138 the outer end of the switch member will press against the cam portion 147 and swing the latch member in a direction away from the cylinder 140 and in opposition to the tension spring 149. After the accelerator is released for a sufficient period of time to permit the full retraction of the switch member 122 which is necessary to close the contacts 130 and 131, the latch member 145 will be swung to the position indicated in Fig. 15 and this will result in the engagement of the locking part 148 with a holding member 150. The latter member may be supported by a flexible strip 151 or the like which yieldably holds the same in position to be engaged by the latch member 145.

When the accelerator is thereafter depressed and the switch member 122 moves to the position shown in Fig. 11, the latch member 145 remains in engagement with the holding member 150. If the operator did not release the accelerator long enough to permit sufficient movement of the switch member 122 to cause engagement of the contacts 130 and 131, the latch member 145 will not be swung to the right far enough to cause engagement of the locking part 148 with the holding member 150. The result will be that when the operator again depresses the accelerator the latch member 145 will swing to the position shown in Fig. 16, and the locking part 148 will catch the outer end of the switch member 122 and prevent the latter member from moving far enough to cause engagement of the wedge member 125 with the wedge member 126. If this condition occurs the armature 120 will be free to contact with 115 as the engine speeds up but the signal lamp cannot light in error because the circuit is open at contacts 125 and 126.

To illustrate the operation of the indicating apparatus of Figs. 10 to 16, inclusive, by means of a hypothetical case, let it be assumed that the vehicle is traveling at fifty miles per hour and that the overdrive gearing is in operation. In this condition the green lamp 117 is lighted by current supplied through members 125 and 126, switch member 122, and contacts 115 and 119. If the accelerator is now released by the operator the green light is extinguished by reason of the separation of members 125 and 126 and remains extinguished for about two seconds, but at the end of that interval of time is relighted upon the closing of contacts 130 and 131. Assuming that the vehicle speed slows down to about thirty-six miles per hour while the accelerator is released, the overdrive gearing will be automatically rendered inoperative by retraction of the pawls 221 and the vehicle is thereupon placed in free-wheeling. The effect of the free-wheeling condition is to permit the engine speed to decrease to the point where the magnetization of the relay winding 114 is sufficiently reduced to permit the spring 128 to move contact 119 away from contact 115 and into engagement with contact 116. This causes the green lamp 117 to be extinguished and the red lamp 118 to be lighted.

If the operator should now desire to change back to overdrive gear he depresses the accelerator and the vehicle speed increases. Upon depressing the accelerator the red light will go out momentarily by separation of contacts 130 and 131, but will immediately be relighted upon closing of contacts 125 and 126 and will remain lighted. When the vehicle speed has increased to about forty-three miles per hour the operator releases the accelerator for the required two-second interval to permit the overdrive gearing to be put into operation. During this interval the red light is extinguished, by reason of the opening of contacts 125 and 126, but if the overdrive successfully engages, the contacts 115 and 119 will close and at the end of the time interval the green lamp will be lighted when contacts 130 and 131 close.

The green lamp remains lighted while the overdrive gearing is in use, except for the momentary shifting of switch member 122 from contact 131 to member 126 as the accelerator is again depressed, and thereafter the wedge member 125 acting as a holding means retains the armature 120 in the position corresponding with the closed position of the green lamp contacts 115 and 119.

If the driver did not release the accelerator for the interval of time required for the overdrive pawls 221 to engage, the parts of the switch device 112 will assume the relative positions shown in Fig. 16 and neither lamp will be lighted. This will inform the operator that the overdrive did not engage and that he should repeat the operation.

It will be readily seen that adjustment of my overdrive indicator can be made, to suit the time interval and vehicle speed required for the overdrive to engage, by selecting or substituting a spring of appropriate tension characteristics for the spring 90 of Fig. 9 or the spring 128 of Figs. 10 and 11.

When the red and green signal lamps are mounted in a casing 40, as shown in Fig. 17, I provide the casing with a window or screen 158, such that a red or green glow will be visible as the result of either the red or green lamp being lighted.

In each of the indicating systems illustrated in Figs. 4, 8 and 9 I show both the accelerator switch 41 and the overdrive unit switch 42 in the circuit of each signal lamp. While this arrangement may be desirable for manufacturing and other reasons it is not necessary because, as shown in Fig. 18, the circuit for the red signal lamp 38a need not extend through the accelerator switch 41' but need extend only through the overdrive unit switch 42'. This is possible because whenever the switch 41' would be open the accelerator would be depressed and the increased engine speed would cause opening of the relay contacts for the red signal lamp.

From the foregoing description and the accompanying drawings it will now be readily understood that I have provided novel apparatus for indicating whether or not overdrive gearing is in operation, and that the functioning of such overdrive indicating apparatus takes place automatically. It will be seen further that such indicating apparatus is very useful on motor vehicles having overdrive units, because it enables the operator to know definitely the condition of the transmission of the vehicle.

While I have illustrated and described my indicating apparatus in a somewhat detailed manner, it will be understood, of course, that I do not wish to be limited to the precise arrangements and operations illustrated and described, but regard my invention as including such changes and modifications as do not involve a departure from the spirit of the invention and the scope of the appended claims.

Having thus described my invention I claim:

1. In a motor vehicle having an engine and driving axle, an accelerator manually operable to control engine speed, a transmission mechanism between the engine and axle including an overrunning clutch and gearing providing an overdrive ratio between engine and axle, said mechanism also including speed responsive means for rendering said gearing operative, and signal means for automatically indicating when said gearing has been rendered operative comprising an electric signal device and a pair of switches controlling said device and connected in series with each other, a circuit for energizing said signal device and including the series connected switches, one of said switches being arranged to close upon release of said accelerator, and means responsive to predetermined engine speed for closing the other switch.

2. In a motor vehicle an engine, a propelling means, a transmission between the engine and propelling means including an overdrive device having gearing affording an overdrive ratio and automatic means responsive to a predetermined vehicle speed for rendering the gearing operative or inoperative, a control manually operable for controlling engine speed and initiating operation of said automatic means when the speed of the vehicle is above said predetermined speed, a generator driven from the engine, and signal means for indicating whether the overdrive device has been rendered operative comprising an electric signal device and a pair of switches controlling said signal device and connected in series with each other, a circuit for energizing said signal device and including the series connected switches, one of said switches being arranged to close upon release of said control, and a relay in circuit with the generator for closing the other switch in response to a predetermined engine speed.

3. In combination with a motor vehicle having an engine and an overdrive device connected therewith, said overdrive device being of the type comprising gearing affording an overdrive ratio and speed responsive means for automatically rendering said gearing operative, a manually operable control for rendering the overdrive device initially operative or inoperative, an accelerator, a generator driven from the engine, an overdrive indicator comprising an electric signal device and a control therefor including a relay in circuit with the generator and switches associated respectively with said manually operable control and said accelerator, and a circuit for energizing said signal device and including said switches, one of said switches being arranged to be opened or closed by actuation of said manually operable control and the other being arranged to close upon release of the accelerator.

4. In combination with a motor vehicle having an engine and an overdrive device connected therewith, said overdrive device being of the type comprising gearing affording an overdrive ratio and speed responsive means for automatically rendering said gearing operative, a manually operable control for rendering the overdrive device initially operative or inoperative, a manually operable accelerator for the engine, a generator driven from the engine, an overdrive indicator comprising an electric lamp, a relay having a winding in circuit with said generator, and a circuit for said lamp including contacts of said relay and a switch arranged to close upon release of the accelerator.

5. In combination with a motor vehicle having an engine and an overdrive device connected therewith, a manually operable control for rendering the overdrive device initially operative or inoperative, said device embodying automatic speed responsive means for subsequently rendering the same effective or ineffective, an accelerator, a generator driven by the engine, an overdrive indicator having a pair of signal devices one indicating when the overdrive device is effective and the other for indicating when the overdrive device is ineffective, a relay having a winding in circuit with said generator, said relay also having a pair of stationary contacts connected with the respective signal devices and a contact movable to engage one or the other of the stationary contacts, and a switch controlling both signal devices and adapted to be closed upon release of said accelerator.

6. In combination with a motor vehicle having an overdrive device, a manual control for rendering said device initially operative or inoperative and an accelerator for controlling engine speed, said overdrive device being of the type comprising gearing affording an overdrive ratio and speed responsive means for automatically rendering said gearing operative, a plurality of electric signal devices one for indicating when the overdrive device is operating and the other for indicating when the overdrive device is not operating, signal control means including a switch device responsive to engine speed and automatically operative to select one or the other of said signal devices and a second switch arranged to close upon release of said accelerator, and a circuit for energizing the signal devices and having therein said switch device and said second switch.

7. In combination with a motor vehicle having an engine, an overdrive device and a manual control for rendering said device initially operative or inoperative, said overdrive device being of the type comprising gearing affording an overdrive ratio and speed responsive means for automatically rendering said gearing operative, a plurality of electric signal devices one for indicating when the overdrive device is operating and the other for indicating when the overdrive device is not operating, an accelerator for controlling the speed of said engine, a switch mechanism controlling said signal devices and comprising a relay adapted to be energized upon predetermined increase in engine speed, a movable switch member responsive to energization of the relay and movable to select one or the other of said signal devices, energizing circuits for said signal devices and said relay, a holding member movable into engagement with said movable switch member for retaining the latter in the signal-selecting position to which it has been previously moved in response to the relay, means connecting said holding member with said accelerator for movement in response to actuation of the latter, and a retarding device connected with said holding member and adapted to retard movement of the latter in a direction to disengage said switch member.

MAX E. LANGE.